United States Patent Office 3,385,136
Patented May 28, 1968

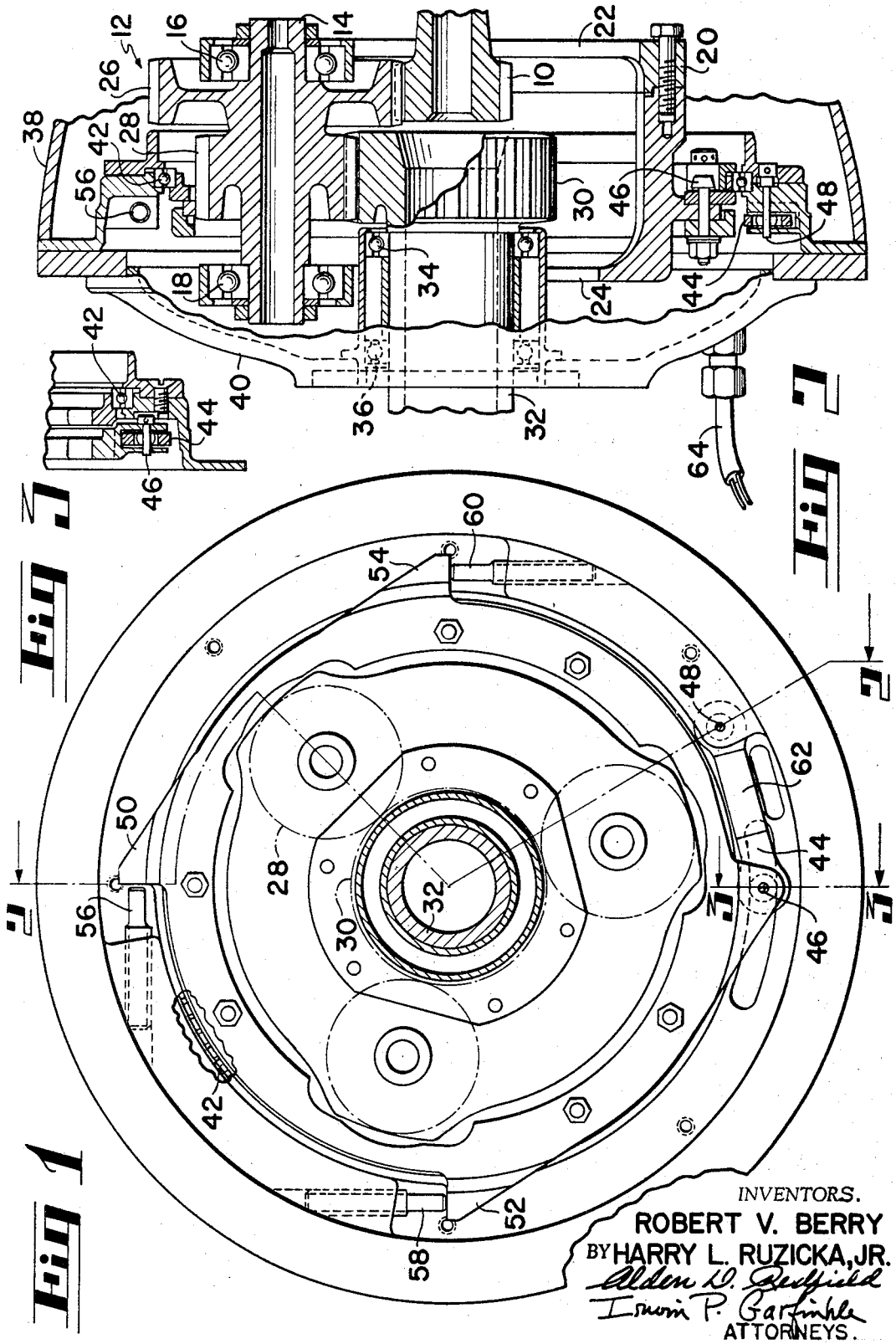

3,385,136
STRAIN GAUGE TORQUEMETER FOR MEASURING THE TORQUE IN EPICYCLIC TRANSMISSION
Robert V. Berry, Trumbull, and Harry L. Ruzicka, Jr., Monroe, Conn., assignors to Avco Corporation, Stratford, Conn., a corporation of Delaware
Filed Mar. 15, 1966, Ser. No. 534,523
2 Claims. (Cl. 74—801)

ABSTRACT OF THE DISCLOSURE

The ring gear of a planetary gear set is mounted in bearings but is restrained from rotation by a fixed link carrying a strain gauge. The strain on the link measures shaft torque. Stops are provided for preventing rotation in the event of link failure.

---

This invention discloses means for measuring the torque developed in the output of a planetary gear transmission used as reduction gearing between a power plant, such as a gas turbine engine, and a load, such as a helicopter blade.

The conventional planetary gear transmission comprises three members; an input member, an output member, and a reaction member. In accordance with the illustrated form of this invention, the input and output members are sun gears, while the reaction member is the carrier for the planet gears. The carrier is supported in annular bearings but is rotatably fixed by means of the torque-sensing element which comprises a steel link to which a strain gauge member is affixed. Thus, in accordance with this invention the torque developed in the output sun gear is determined by the strain developed in the link serving to fix the reaction member of the transmission. The reaction member may be any one of the three elements of the transmission, so long as the other two members are rotatable.

It is an object of this invention to provide simplified and accurate torque measuring means requiring minimum modification to conventional planetary gear transmissions and in which torque is measured by an axial strain developed in a link serving to fix the reaction member of the transmission. It is to be understood that the axial strain in the link is tangential to the torque.

Another object of this invention is to lock the reaction member of a planetary gear transmission with a tangential rigid link for developing a measurable axial strain in said link, said strain being a function of torque.

Another object of this invention is to provide means for measuring the torque developed in a planetary gear transmission having an input gear, a carrier carrying planet gears and an output gear, and an annular bearing having inner and outer races, said inner race supporting said carrier, said outer race being angularly fixed, a rigid link tangentially connected between said carrier and said outer race for developing an axial strain in said link due to reaction forces in said carrier due to torque developed in said input and output gears, and an electrical strain gauge element intimately affixed to said link.

For a better understanding of the nature of this invention and for further objects, reference should now be made to the following detailed specification and to the accompanying drawings in which:

FIGURE 1 is a front view of the transmission with the cover plate removed;

FIGURE 2 is a section taken through the line 2—2 of FIGURE 1; and

FIGURE 3 is a section showing the linkage taken through the line 3—3 of FIGURE 1.

The planetary gear transmission utilized in this invention includes an input sun gear 10 driven by means of a power plant, such as a gas turbine engine which is not shown. The sun gear 10 drives planetary reduction gearing 12 having a shaft 14 supported in ball bearings 16 and 18. The outer races of the bearings 16 and 18 are supported in the hollow of a carrier 20 having end walls 22 and 24 shaped to contain the bearings 16 and 18. The planet gears 12 consist of a set of three larger diameter gears 26 and a set of smaller diameter gears 28, the large gears 26 being driven by the input sun gear 10 and the smaller planet gears 28 driving an output sun gear 30 integrally coupled to an output shaft 32 suitably supported in bearings 34 and 36. The entire transmission is contained within a housing 38 which is closed at its output end by a cover 40.

The carrier 20 for the planetary gears 12 is supported in an annular roller bearing 42, the outer race of which is secured to the housing 38. The carrier is angularly fixed by means of a steel strain gauge link 44 pivoted at one end from the carrier 20 by means of a pin 46 and at the other end to the housing structure 38 by means of a pin 48.

The exterior of the carrier is provided with three radial projections 50, 52, and 54. At corresponding locations on the housing structure 38 are located three corresponding adjustable abutment pins 56, 58, and 60 which are positioned to abut the projections 50, 52, and 54 in the event of a failure in the link 44. The adjustable abutment pin 56 in cooperation with the projection 50 prevents rotation of the carrier 20 in a counterclockwise direction in the event of a development of negative torque (as, for example, that which might be developed when a helicopter blade rotates the engine), while the abutment pins 58 and 60 in cooperation with the projections 52 and 54, respectively, serve to prevent clockwise rotation of the carrier 20 in the event of failure of the link 44 during positive torque conditions (as when the engine is operating normally to drive the blades).

A strain gauge resistive element 62 is bonded by any suitable means to the strain gauge link, and the electric conducting wires 64 connected to the element are led to a suitable calibrated meter (not shown).

In operation, the torque developed in the input sun gear 10 is transmitted through the planetary gearing 12 to the output sun gear 30. Since the position of the carrier 20 for the planetary gearing 12 is angularly fixed, the carrier becomes, in this instance, the reaction member. It will be understood, however, that under suitable circumstances any one of the other members may be the reaction members while the other members are the input and output members. That is to say, either the input gear or the output gear could be fixed and the carrier be made rotatable. Under those circumstances the fixed sun gear would be the reaction member. Furthermore, while an output sun gear 30 is illustrated, the sun gear might take the form of a ring gear driven by the three planet gears 28. In any of these cases the results would be the same; that is, the reaction forces developed in the reaction member are developed as an axial strain in the tangentially positioned strain gauge link 44. By measuring the strain in the link 44 by means of a strain gauge resistive element 62 and a suitably calibrated meter, a very precise measure of torque may be obtained.

The invention is fail-safe because of the projection of the abutment means which prevents rotation of the reaction member in the event of link failure.

The use of a single link is highly advantageous because only a single member need be calibrated, and matching of the various strain gauge elements is not required. On the other hand, the system is entirely safe; first, because the link may be very strong, and, second, because of the use of the fail-safe abutment features for preventing rotation in either direction in the unusual event of a link failure. The torque measuring system has no moving parts under normal operating conditions and should have an operating life at least equal to that of the remainder of the transmission.

Various modifications and adaptations of this invention will be apparent to persons skilled in the art. It is intended, therefore, that this invention be limited only by the appended claims as interpreted in the light of the prior art.

What is claimed is:

1. In a planetary gear transmission having an input member, an output member, and a reaction member, said input and output members being input and output sun gears, respectively, and said reaction member being a carrier for a set of planetary gears, said planetary gears being driven by said input sun gear and driving said output sun gear, the combination comprising:
    a housing;
    bearing means for rotatably supporting each of said members within said housing;
    a link tangentially connected between said reaction member and said housing for angularly fixing said reaction member with respect to said housing, said link being pivotally connected at its ends to said reaction member and to said housing;
    a strain-sensitive device affixed to said link;
    projection means on said carrier; and
    adjustable abutment means on said housing, respective ones of said projection and abutment means cooperating to prevent rotation of said carrier with respect to said housing in the event of failure of said link.

2. The invention as defined in claim 1 wherein said strain-sensitive device is a resistor.

References Cited

UNITED STATES PATENTS

| | | | |
|---|---|---|---|
| 2,233,498 | 3/1941 | Taylor | 74—305 |
| 2,472,047 | 5/1949 | Ruge | 73—141 |
| 2,581,239 | 1/1952 | Clark et al. | 73—136 |
| 2,691,300 | 10/1954 | Morris | 73—136 |
| 2,724,266 | 11/1955 | Baker et al. | 73—136 |

FRED C. MATTERN, Jr., *Primary Examiner.*

DONLEY J. STOCKING, *Examiner.*

T. R. HAMPSHIRE, *Assistant Examiner.*